(12) United States Patent
Yentzer et al.

(10) Patent No.: US 9,839,566 B2
(45) Date of Patent: Dec. 12, 2017

(54) WHEEL CHAIR WITH AUTOMATIC BREAKING

(71) Applicant: Safely Made U.S.A., L.L.C., Tucson, AZ (US)

(72) Inventors: Dana R. Yentzer, Tucson, AZ (US); Melvin G. Hector, Jr., Tucson, AZ (US); Mark F LaVeer, Marana, AZ (US)

(73) Assignee: SAFELY MADE USA, L.L.C., Tucson, AZ (US)

( * ) Notice: Subject to any disclaimer, the term of this patent is extended or adjusted under 35 U.S.C. 154(b) by 0 days.

(21) Appl. No.: 14/634,779

(22) Filed: Feb. 28, 2015

(65) Prior Publication Data
US 2016/0270989 A1    Sep. 22, 2016

Related U.S. Application Data

(60) Provisional application No. 61/946,126, filed on Feb. 28, 2014.

(51) Int. Cl.
| | |
|---|---|
| *B62M 1/14* | (2006.01) |
| *A61G 5/10* | (2006.01) |
| *A61G 5/02* | (2006.01) |
| *B60T 7/14* | (2006.01) |
| *A61G 5/08* | (2006.01) |

(52) U.S. Cl.
CPC ............. *A61G 5/1005* (2013.01); *A61G 5/02* (2013.01); *A61G 5/08* (2013.01); *A61G 5/0816* (2016.11); *A61G 5/0825* (2016.11); *A61G 5/0883* (2016.11); *A61G 5/101* (2013.01); *A61G 5/1013* (2013.01); *B60T 7/14* (2013.01)

(58) Field of Classification Search
CPC .... A61G 5/101; A61G 5/1021; A61G 5/0825; A61G 5/0883; A61G 5/1005; A61G 5/1013; A61G 5/1035
USPC ................................ 188/2 F, 109; 280/250.1
See application file for complete search history.

(56) References Cited

U.S. PATENT DOCUMENTS

| | | | | |
|---|---|---|---|---|
| 2,053,852 | A | * | 9/1936 | Tracy ........................ A61G 5/14 188/109 |
| 2,259,924 | A | * | 10/1941 | Connolly .............. A61G 5/1018 188/109 |
| 3,302,757 | A | * | 2/1967 | Eagleson, Jr. ........ A61G 5/1018 188/109 |
| 3,529,700 | A | * | 9/1970 | Marshall .............. A61G 5/1018 188/109 |
| 3,968,991 | A | * | 7/1976 | Maclaren ................. A61G 5/08 248/436 |

(Continued)

*Primary Examiner* — Joseph M Rocca
*Assistant Examiner* — Conan D Duda

(57) ABSTRACT

A wheel chair with several new and useful features is provided. Those new and useful features provide the wheel chair with enhanced lateral stability, automatic cocking of an automatic locking device whenever an occupant sits in the wheel chair, and a holding mechanism that enables the wheel chair to be freely wheeled about when there is no occupant, and automatically move to a cocked state as soon as an occupant sits on the chair. The result is an automatic locking system for a manual wheelchair that unlocks the wheels for intentional motion when the chair is occupied, and locks the wheelchair wheels immediately when it is unoccupied, yet in no way interferes with the typical locking mechanism of the standard manual wheelchair when so desired.

18 Claims, 16 Drawing Sheets

(56) References Cited

U.S. PATENT DOCUMENTS

| | | | | |
|---|---|---|---|---|
| 4,320,818 | A * | 3/1982 | Knoche | A61G 5/1018 188/109 |
| 4,350,227 | A * | 9/1982 | Knoche | A61G 5/1018 188/2 F |
| 4,623,043 | A * | 11/1986 | Babilas | A61G 5/1018 188/106 R |
| 5,203,433 | A * | 4/1993 | Dugas | A61G 5/1027 188/109 |
| 5,358,266 | A * | 10/1994 | Roth | A61G 5/1018 188/2 F |
| 5,593,173 | A * | 1/1997 | Williamson | A61G 5/08 280/250.1 |
| 5,727,809 | A * | 3/1998 | Ordelman | A61G 5/027 280/250.1 |
| 5,894,912 | A * | 4/1999 | Dobben | A61G 5/1037 188/2 F |
| 5,984,334 | A * | 11/1999 | Dugas | A61G 5/10 188/109 |
| 6,092,824 | A * | 7/2000 | Ritchie | A61G 5/10 188/109 |
| 6,264,007 | B1 * | 7/2001 | Norton | B60T 1/005 188/2 F |
| 6,279,936 | B1 * | 8/2001 | Ritchie | A61G 5/10 188/2 F |
| 6,315,085 | B1 * | 11/2001 | Dahlem | B60T 1/04 188/2 F |
| 6,347,688 | B1 * | 2/2002 | Hall | A61G 5/101 188/2 F |
| 6,371,503 | B2 * | 4/2002 | Ritchie | A61G 5/10 188/2 F |
| 6,431,572 | B1 * | 8/2002 | Harden | A61G 5/1018 180/272 |
| 6,572,133 | B1 * | 6/2003 | Stevens | A61G 5/08 280/250.1 |
| 6,851,522 | B2 * | 2/2005 | Wren | A61G 5/1018 188/2 F |
| 6,863,293 | B2 * | 3/2005 | Kimura | A61G 5/1027 188/2 F |
| 6,978,864 | B2 * | 12/2005 | Peron | A61G 5/1035 188/109 |
| 7,066,482 | B2 * | 6/2006 | Ford | A61G 5/1018 188/2 F |
| 8,424,654 | B2 * | 4/2013 | Landry | A61G 5/10 188/2 F |
| 8,622,409 | B2 * | 1/2014 | Hector, Jr. | A61G 5/10 188/109 |
| 8,998,245 | B1 * | 4/2015 | Anooshian | A61G 5/08 280/649 |
| 9,027,948 | B2 * | 5/2015 | Ooyama | A61G 5/1018 280/250.1 |
| 2002/0093156 | A1 * | 7/2002 | Stevens | A61G 5/08 280/42 |
| 2002/0175027 | A1 * | 11/2002 | Usherovich | A61G 5/10 188/2 F |
| 2003/0098568 | A1 * | 5/2003 | Keppler | A61G 5/1027 280/304.1 |
| 2003/0146056 | A1 * | 8/2003 | Wren | A61G 5/1018 188/2 F |
| 2003/0189310 | A1 * | 10/2003 | Connors | A61G 5/14 280/304.1 |
| 2004/0080138 | A1 * | 4/2004 | Kimura | A61G 5/1027 280/250.1 |
| 2004/0104081 | A1 * | 6/2004 | Peron | A61G 5/1035 188/19 |
| 2005/0248121 | A1 * | 11/2005 | Ford | A61G 5/1018 280/304.1 |
| 2005/0248122 | A1 * | 11/2005 | Ford | A61G 5/1018 280/304.1 |
| 2010/0225086 | A1 * | 9/2010 | Hector, Jr. | A61G 5/10 280/250.1 |
| 2010/0320037 | A1 * | 12/2010 | Landry | A61G 5/10 188/69 |
| 2011/0018221 | A1 * | 1/2011 | Anooshian | A61G 5/08 280/250.1 |
| 2013/0257010 | A1 * | 10/2013 | Hector, Jr. | A61G 5/101 280/250.1 |
| 2016/0220432 | A1 * | 8/2016 | Ooyama | A61G 5/1021 |

* cited by examiner

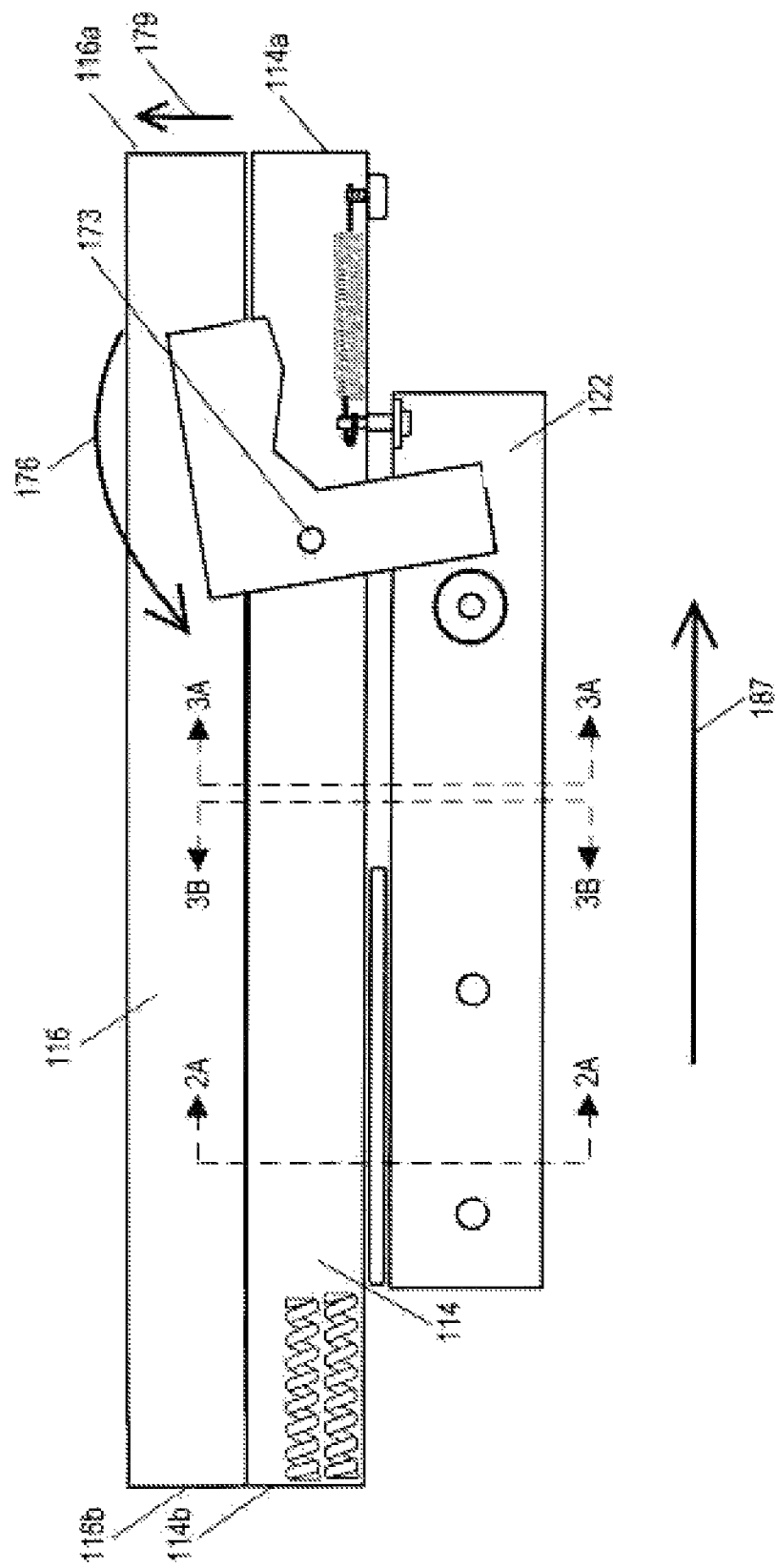

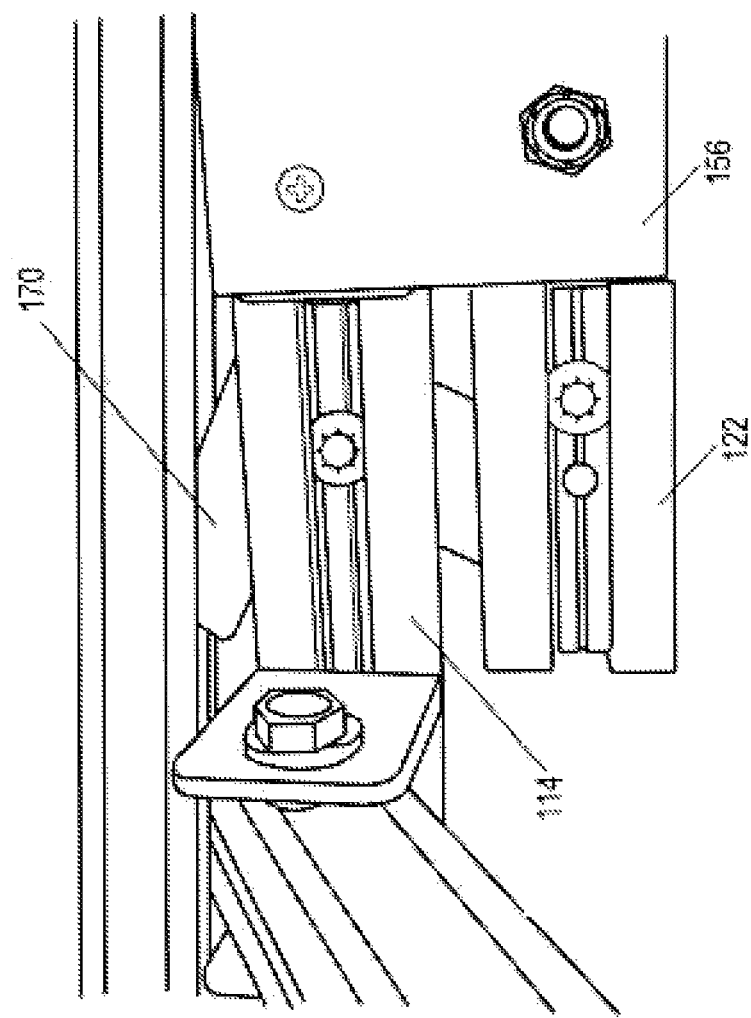

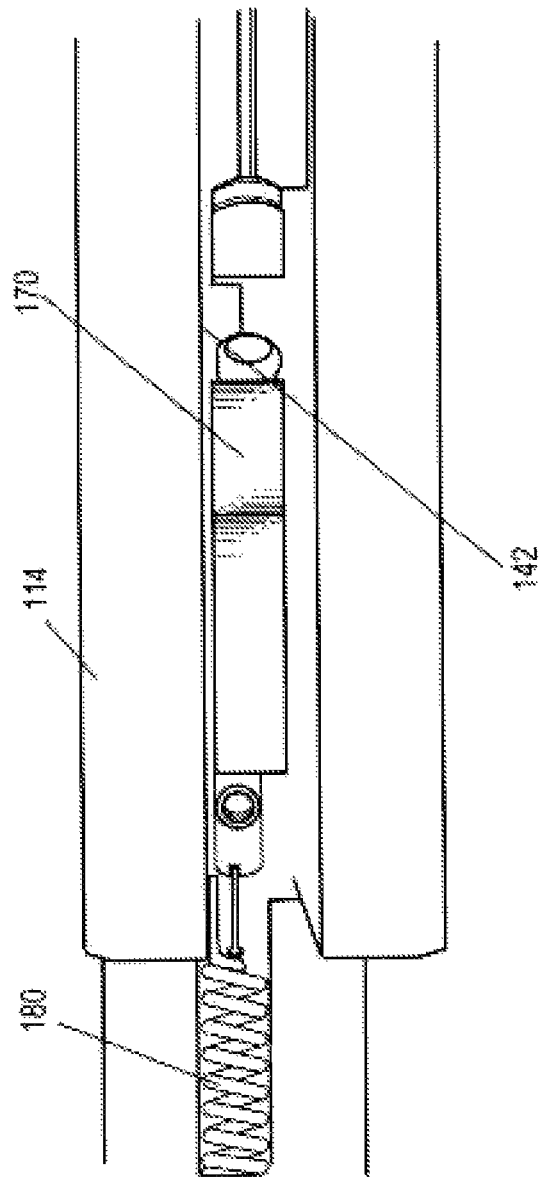

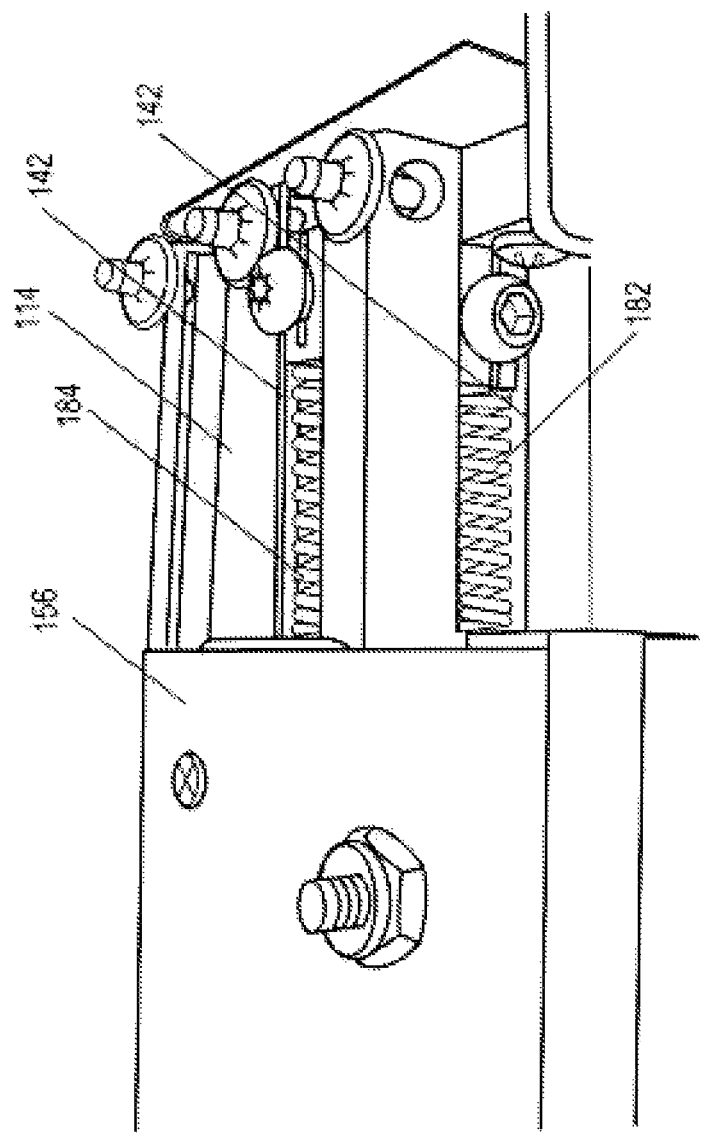

WHEEL CHAIR WITH AUTOMATIC BREAKING

RELATED APPLICATION(S)/CLAIM OF PRIORITY

This application is related to and claims priority from U.S. provisional application Ser. No. 61/946,126, filed Feb. 28, 2014, which provisional application is incorporated by reference herein.

INTRODUCTION

The present invention relates to new and useful features for a wheel chair, of the type disclosed in application Ser. No. 12/716,875 (filed Mar. 3, 2010, and now U.S. Pat. No. 8,622,409) and Ser. No. 13/598,349, filed Aug. 29, 2012, each of which is incorporated by reference herein. Each of those applications discloses a new and useful concept for providing a manually prepared vehicle such as a wheel chair with an automatic braking feature. The braking feature can be integrated into the wheel chair at the time the wheel chair is constructed, and can also be retrofitted to an existing wheel chair.

SUMMARY OF THE PRESENT INVENTION

The present invention provides a device that is consistent with the concept of U.S. application Ser. Nos. 12/716,875 and 13/598,349, in providing an automatic locking device for a manually propelled vehicle such as a wheel chair, and also provides several new and useful features for such a wheel chair.

One new feature comprises structure that provides additional stabilization to a folding wheel chair while also enabling the wheel chair to be selectively placed in a condition in which it can be collapsed to a folded condition.

In its preferred construction, the wheel chair has a pair of chair rails and a pair of seat rails, each of which is oriented on top of a respective chair rail, where the pair of seat rails support a seat for an occupant of the wheel chair. The pairs of seat and chair rails are spaced apart when the wheel chair is in an open condition and are moveable toward each other to enable the wheel chair to be collapsed to a folded condition. Each pair of seat and chair rails has respective first ends that can separate from each other, where at least one pair of the seat and chair rails is biased to an orientation where their first ends are separated from each other, and the first ends of the pair of seat and chair rails are automatically moveable against their bias and toward each other when a wheelchair occupant sits on seat supported by the seat rails. The first ends of the pair of seat and chair rails are automatically moveable under the bias to a separated position when a wheelchair occupant starts to rise from the seat. An auto locking mechanism is provided that includes a brake that automatically locks a wheel of the wheel chair against movement when the first ends of the pair of seat and chair move under the bias to a separated position, and automatically unlocks the wheel when a wheelchair occupant sits on the seat and causes the first ends of the seat and chair rails to move toward each other against the bias. In accordance with this feature, the second ends of the pair of seat and chair rails have predetermined positions relative to each other and a lock mechanism maintains the second ends of the pair of seat and chair rails in the predetermined positions relative to each other during all relative movements of the first ends of the seat and chair rails relative to each other when the wheelchair is occupied. The lock mechanism is selectively releasable to allow the pairs of seat and chair rails to move up or down together and toward each other when the wheelchair is being collapsed.

In a preferred embodiment of this feature, a latch is associated with the lock mechanism and is selectively operable to release the lock mechanism and allow the pairs of seat and chair rails to move toward each other when the wheel chair is being collapsed. The lock mechanism engages the second ends of at least one pair of seat and chair rails and maintains them in predetermined relation to each other. The lock mechanism is supported for sliding movement along a vertical frame member at the front of the chair. The lock mechanism has a latch portion with a notch. A spring member is connected with the vertical frame member at the front of the chair, and is biased to a position in which it engages the notch of the latch portion and the lock mechanism in a fixed position along the vertical frame member and in an orientation in which it maintains the chair in an open condition with the second ends of the pair of seat and chair rails in the predetermined positions relative to each other. The spring member is moveable against its bias to release the spring member from the latch, thereby allowing the locking member and the seat and chair rails to slide along the vertical support as the chair is folded to its collapsed position.

In another feature of the present invention at least one of one of the pairs of seat and chair rails has a predetermined orientation in which the seat rails is located on top of the chair rail associated with that seat rail when the wheel chair is in an open condition. The auto locking mechanism comprises a brake shoe located below the chair rail of that pair, and stabilizing structure is provided on at least one side of that pair of seat and chair rails and is configured to maintain lateral stability of that pair of seat and chair rails and the brake shoe whenever the wheel chair is in an open condition (uncollapsed). Moreover, a. The stabilizing structure preferably comprises one or more shims located on at least one side of the pair of seat and chair rails and the brake shoe, to maintain lateral stability of the pair of seat and chair rails and the brake shoe whenever the wheel chair is in an open (uncollapsed) condition. In addition, the auto lock mechanism comprises a brake actuator member that moves in opposite directions in relation to the brake shoe. The brake actuator is (i) automatically moveable in a first direction when an occupant sits on the chair to move the brake shoe to a released position relative to the wheel of the wheel chair and to place one or more springs in a cocked state from which when released they automatically move the brake shoe to a locking position in which it locks the wheel of the wheel chair, and (ii) automatically moveable in a second direction whenever the occupant starts to rise from the chair to release the springs from their cocked state and allows the springs to move the brake shoe to a locking position.

b. The brake shoe is located below the chair rail and is slidably coupled with the chair rail by means of a brake shoe slider bearing, wherein one or more biasing springs acts (directly or indirectly) on the brake shoe and biases the brake shoe into locking engagement with the wheel of the wheel chair. The biasing springs are all in a state of tension or compression that are against their respective bias when the brake shoe is in an unlocked condition, and each biasing spring is released from its state of compression or tension and acts on the brake shoe to urge the brake shoe into engagement with a wheel of the wheel chair when a patient starts to rise from the seat. Preferably, the brake shoe actuator is pivotally connected with the chair rail and acts on the brake shoe to urge the brake shoe to an unlocked condition when a patient is seated on the chair. Also, the brake shoe actuator is pivotally connected with the chair rail and acts on a roller on the brake shoe to urge the brake shoe to the unlocked condition.

c. A stabilizing slider bearing acts between the chair rail and the brake shoe to laterally stabilize the movement of the brake shoe. At least one of the biasing springs comprises a stabilizing compression spring on the inside of the chair rail that acts on the slider bearing and helps urge the brake shoe into engagement with the wheel while also laterally stabilizing the movement of the brake shoe when the brake shoe is urged into engagement with the wheel of the wheelchair. Biasing springs comprise a return spring that acts between the chair rail and the brake shoe actuator to urge the brake shoe actuator to a condition where it raises the seat rail when a patient starts to rise from the seat, to enhance the movement of the brake shoe into engagement with the wheel of the wheelchair when a patient starts to rise from the chair.

In yet another new and useful feature of the wheel chair of the present invention, a gravity operated holding member is in a holding condition in which it holds the first ends of the pairs of seat and chair rails in proximity to each other and in a state in which the biasing springs are in tension and/or compression against their respective spring bias when there is no occupant in the wheel chair, so that the auto locking mechanism is held out of engagement with the wheel of the wheel chair when there is no occupant in the wheel chair. This enables the wheel chair to be freely wheeled, and the gravity operated member is automatically released from the holding condition when an occupant sits on the seat, whereby the occupant will cause the first ends of the pairs of seat and chair rails to move to even closer proximity to each other such that biasing springs are maintained in their respective states of tension or compression that is against their respective bias, when the wheel chair occupant is seated on the seat.

Other features of the present invention will become further apparent from the following detailed description and the accompanying drawings.

BRIEF DESCRIPTIONS OF THE DRAWINGS

FIG. 1D is a schematic illustration of portions of the one of the seat rails, chair rails and brake shoe of FIG. 1C, as the brake shoe is being moved (driven) into its locked engagement with the wheel of the wheel chair;

FIG. 4 is a partial three dimensional view of a portion of the wheel chair, showing portions of the chair rail, brake shoe, seat rail and inside stabilizing cover FIG. 5 is a partial three dimensional view of a portion of the wheel chair, showing the chair rail, the brake shoe actuator and the spring that acts between the chair rail and the brake shoe;

FIG. 6 is a partial three dimensional view of a portion of the wheel chair, showing portions of the springs that are located in respective portions of the chair rail and act between the chair frame and the brake shoe through the brake shoe slider bearing and the inside stabilizing slider bearing located in a portion of the chair rail;

Figure 12:
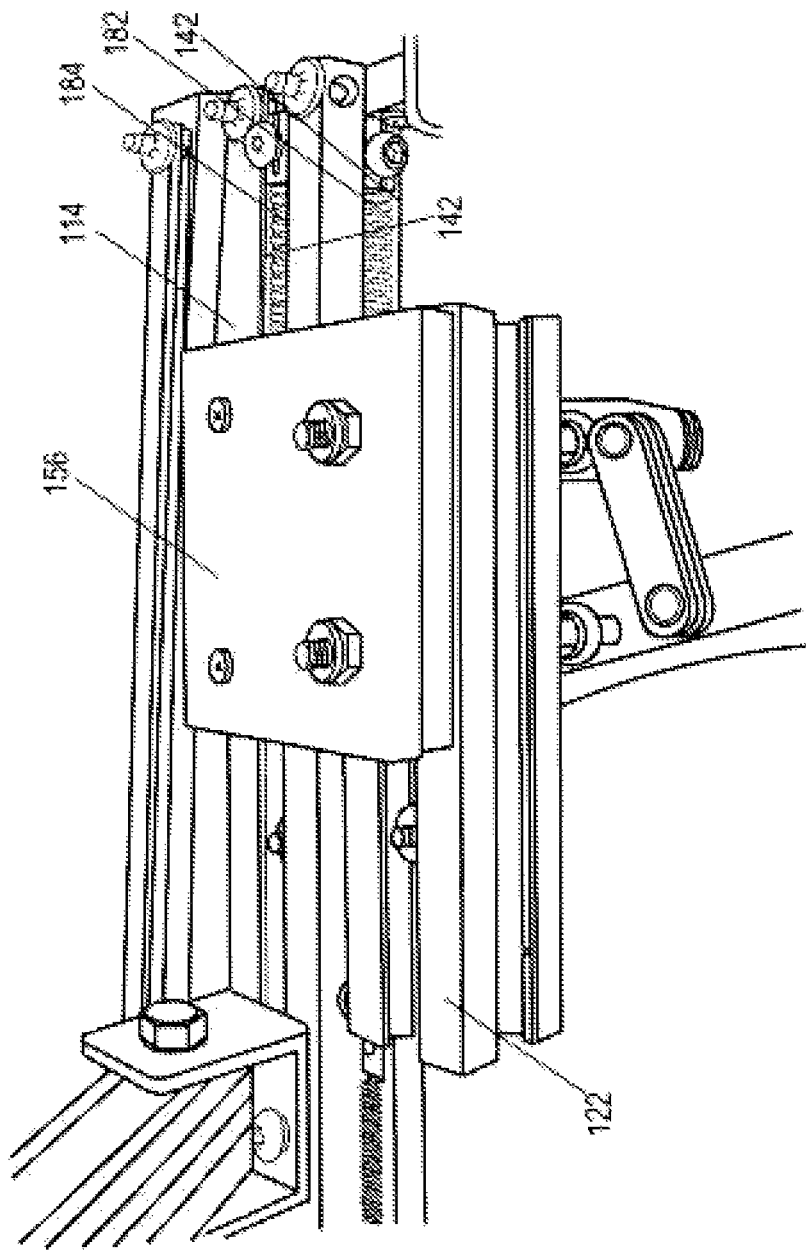
Figure 13:
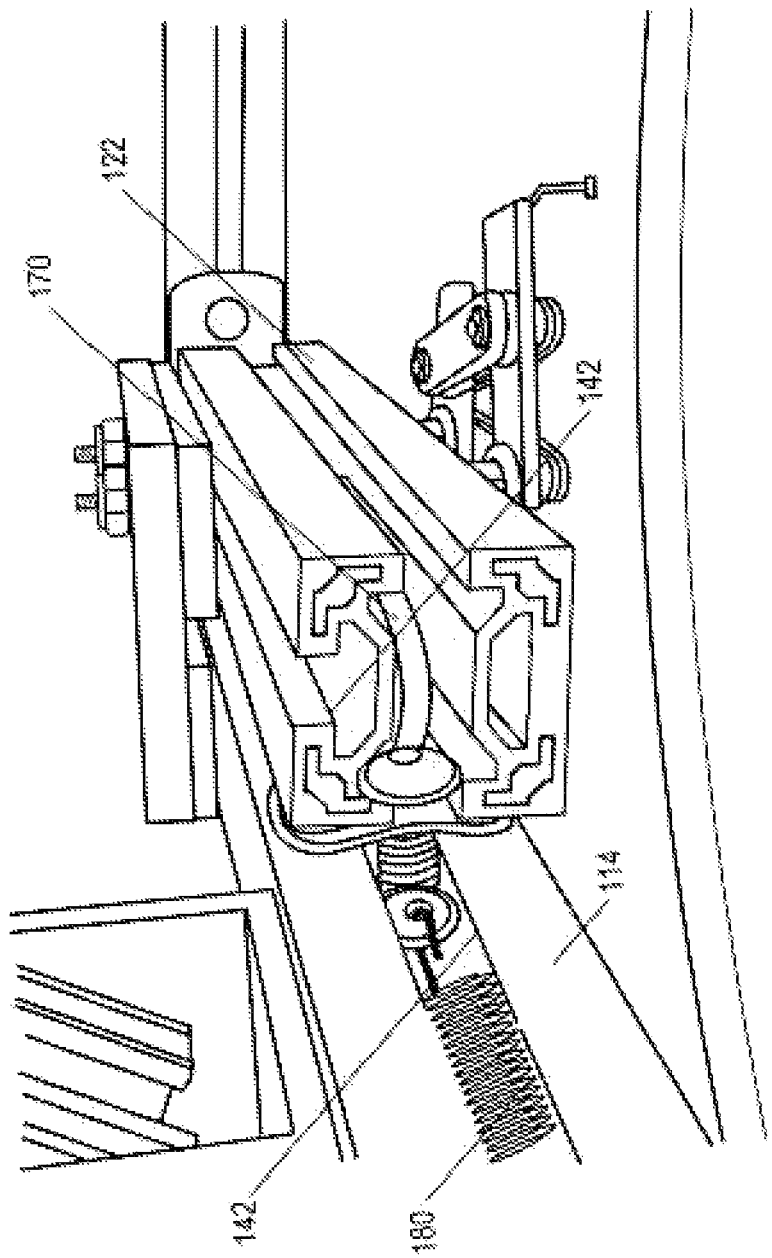

FIG. 12 is a three dimensional view of the chair rail, the brake shoe, the wheel locking structure connected with the brake shoe, the inside stabilizing cover and the springs located inside the chair rail and acting between the frame of the wheel chair and the brake shoe slider bearing and the inside stabilizing slider bearing of the chair rail; and FIG. 13 is a three dimensional view of the chair rail and brake shoe, the inside stabilizing cover and the spring that is located inside the chair rail and acts between the frame and the brake shoe.

DETAILED DESCRIPTION

As discussed above, the present invention provides a device that is consistent with the auto locking concept of U.S. application Ser. Nos. 12/716,875 and 13/598,349, in providing an automatic locking device for a manually propelled vehicle such as a wheel chair, and also provides several new and useful features for such a wheel chair.

The automatic braking assembly and method shown and described in U.S. application Ser. Nos. 12/716,875 and 13/598,349, each of which is incorporated by reference herein, explains the manner in which an automatic braking mechanism automatically locks the wheel of a manually propelled vehicle such as a wheel chair, as soon as an occupant starts to rise from the seat of the vehicle. Those principles are maintained and utilized in an automatic locking assembly according to one of the features of the present invention. The present invention includes new and useful features that provide, e.g. enhanced lateral stabilization of the wheel chair, a system for releasing structural components of the wheel chair to enable the wheel chair to collapse, structure for automatically cocking the auto locking mechanism to a released condition whenever an occupant sits on the chair, and a holding mechanism that can be manually engaged for enabling the auto locking mechanism to be held in a cocked condition when there is no occupant seated in the chair, to enable the chair to be rolled by an attendant, and which automatically releases from the auto locking mechanism when an occupant sits in the chair, so that from the moment the occupant sits in the chair, the chair operates under the automatic locking feature of the present invention.

Figure 1A:
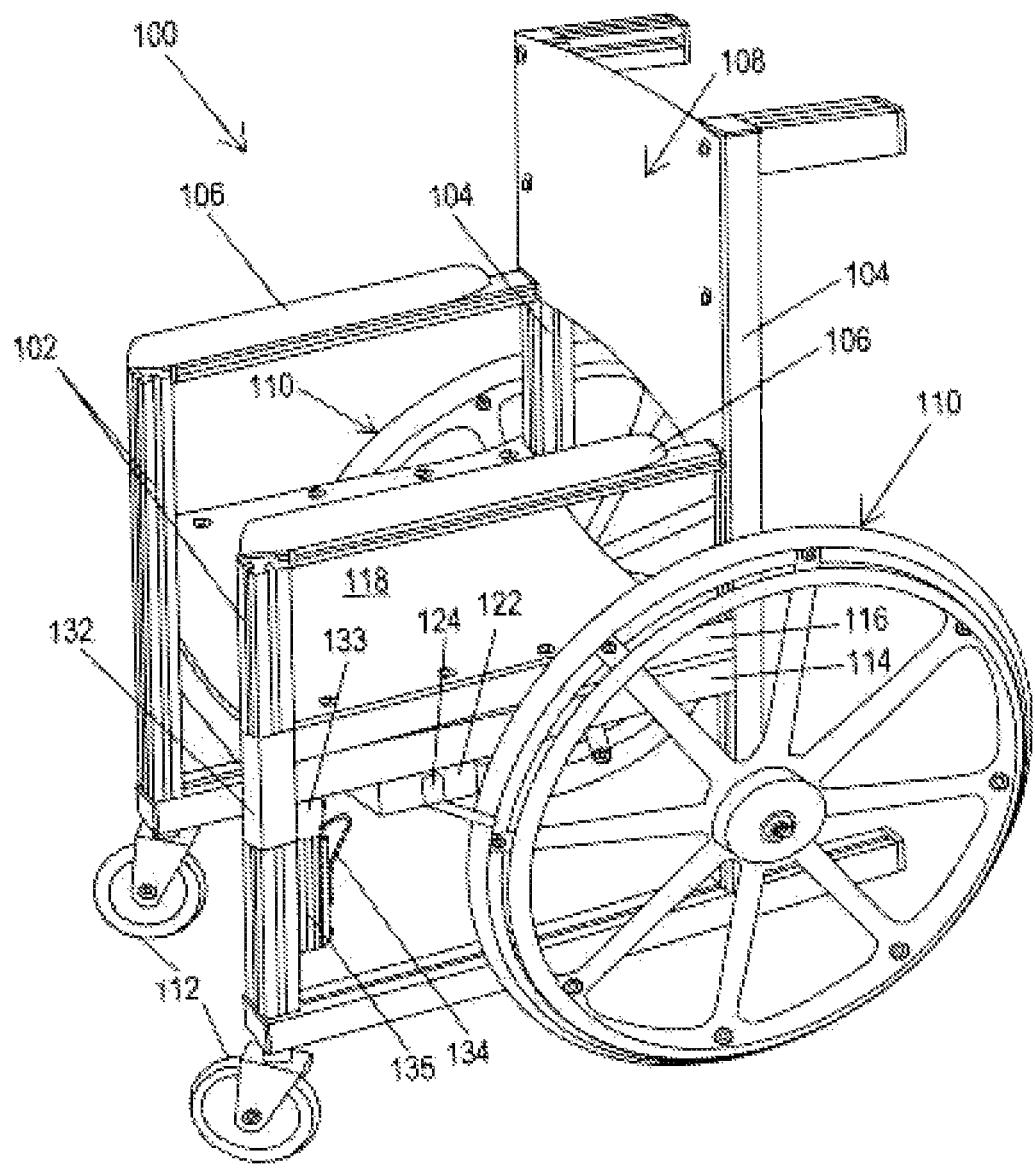
FIG. 1A is a schematic three dimensional illustration of a wheel chair, according to the present invention, in an open condition.
Figure 1B:
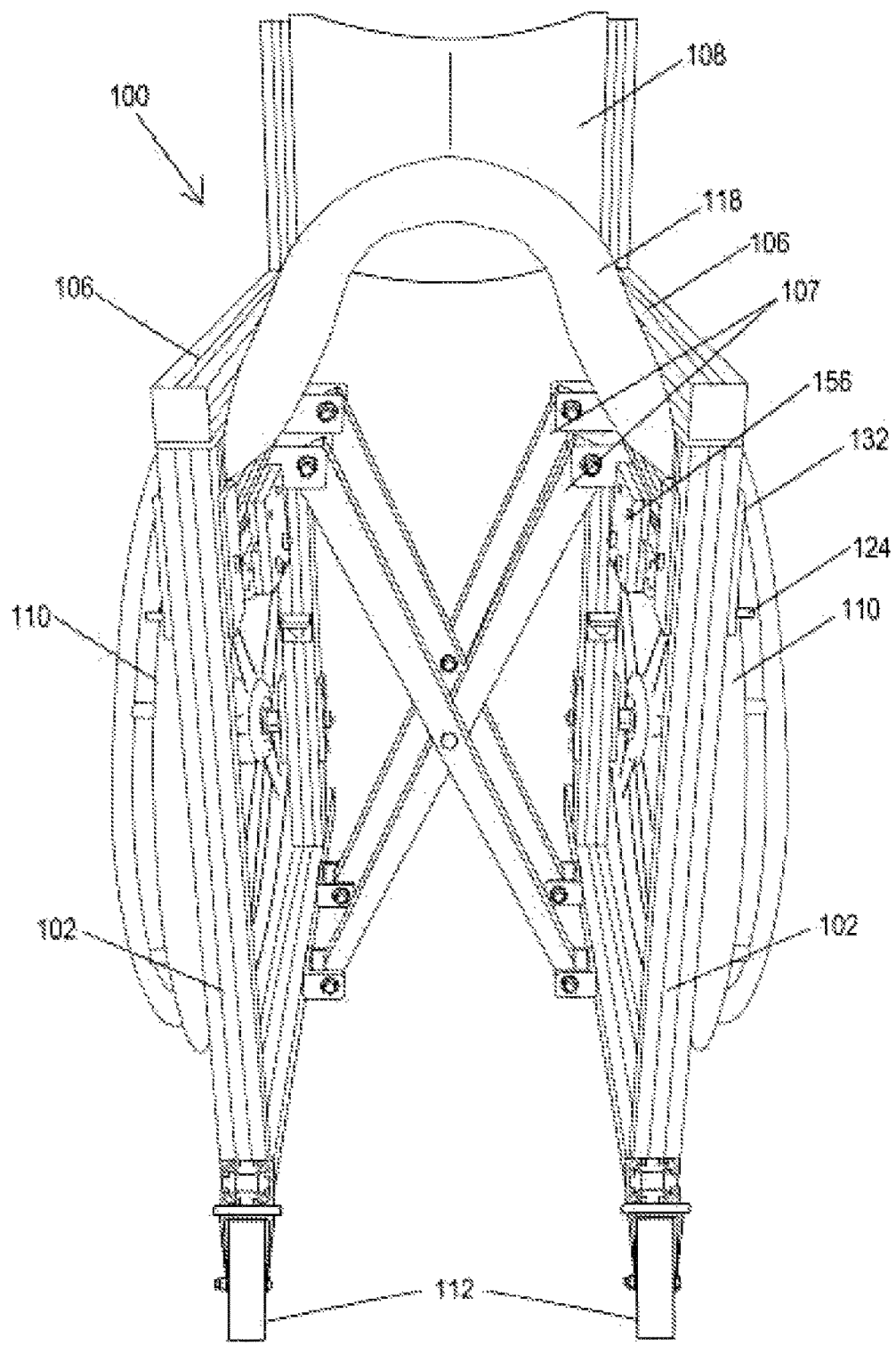
FIG. 1B is a schematic three dimensional illustration of the wheel chair of FIG. 1A, taken from the front of the wheel chair, and showing the wheel chair in a folded, collapsed condition.

FIGS. 1A and 1B provide an overview of a wheel chair 100 constructed according to the present invention. FIG. 1A is a schematic illustration of the wheel chair 100, according to the present invention, in an open condition, and FIG. 1B is a front view of the wheel chair 100 in a collapsed (folded) condition. The wheel chair 100 has a frame comprising a pair of vertical front frame members 102 and a pair of vertical rear frame members 104. The arm rests 106 of the wheel chair extend between the front and rear frame members 102, 104. The rear frame members 104 support a back cushion 108 of the chair, and also provide support for the seat and chair rails of the chair, as described more fully below. The front frame members 102 provide support for the seat and chair rails of the chair, as described more fully below. The rear frame members 104 also support the large rear wheels 110 of the wheel chair and the front frame members 102 support the smaller front wheels 112 of the wheel chair. On the underside of the wheel chair, two sets of X shaped cross pieces 107 are provided, one set nearer the front of the chair and the other nearer the rear of the chair, to provide the chair with additional stability.

One new feature of the present invention comprises structure that provides additional stabilization to a folding wheel chair when the wheel chair is in an open condition, while also enabling the wheel chair to be selectively placed in a condition in which it can be collapsed to a folded condition.

In its preferred construction, the wheel chair 100 has a pair of chair rails 114 and a pair of seat rails 116. Each seat rail 116 is oriented above a respective chair rail 114. The pair of seat rails 116 support a seat 118 for an occupant of the wheel chair. The pairs of seat and chair rails are spaced apart when the wheel chair is in an open condition (FIG. 1A) and are moveable upward or downward and toward each other to enable the wheel chair to be collapsed to a folded condition (FIG. 1B).

Figure 1C:
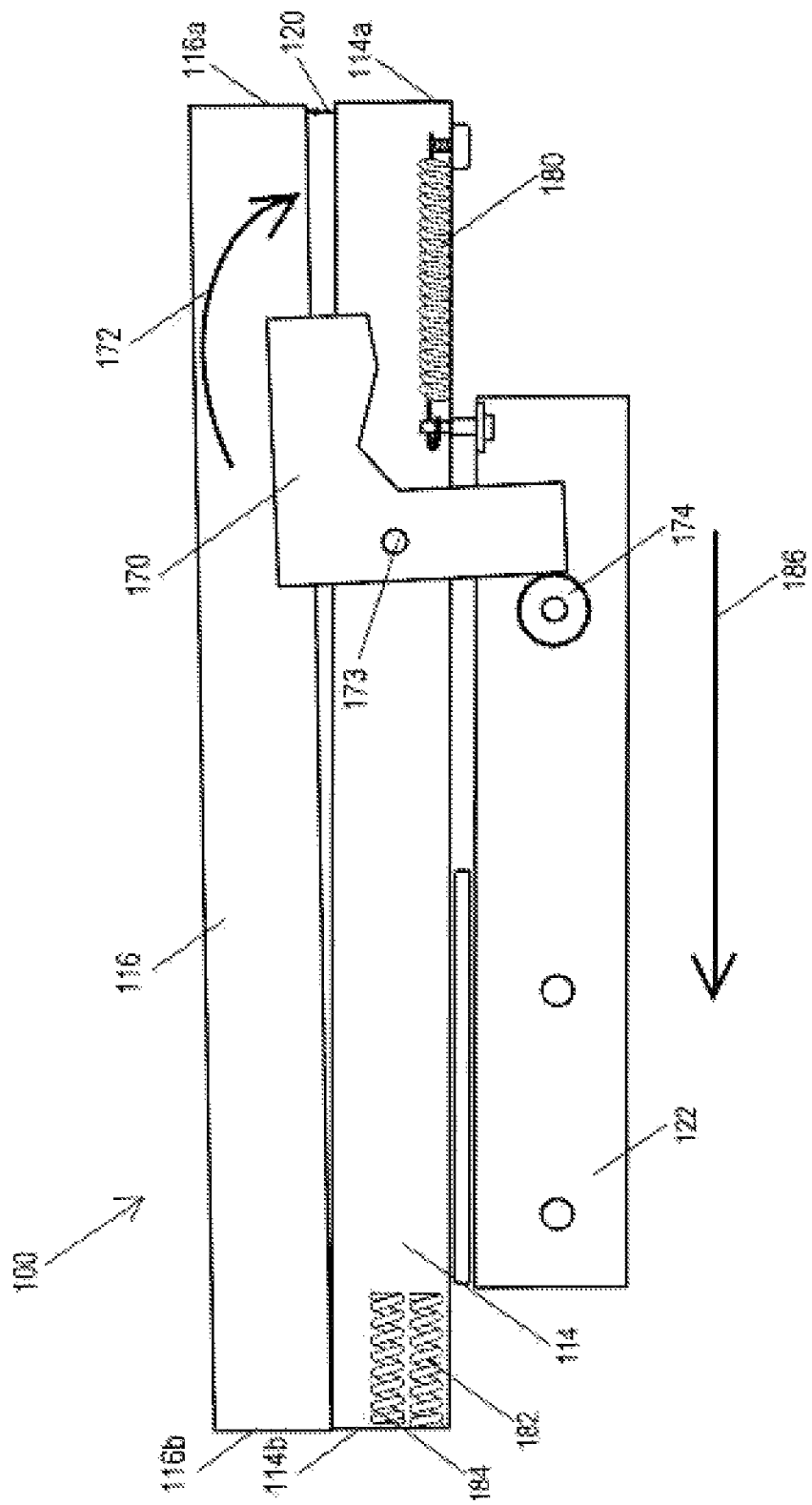
FIG. 1C is a schematic illustration of portions of one of the seat rails, chair rails and brake shoe, as the brake shoe is being automatically placed in an unlocked condition, in which it is separated from the wheel of the chair.
Figure 2A:
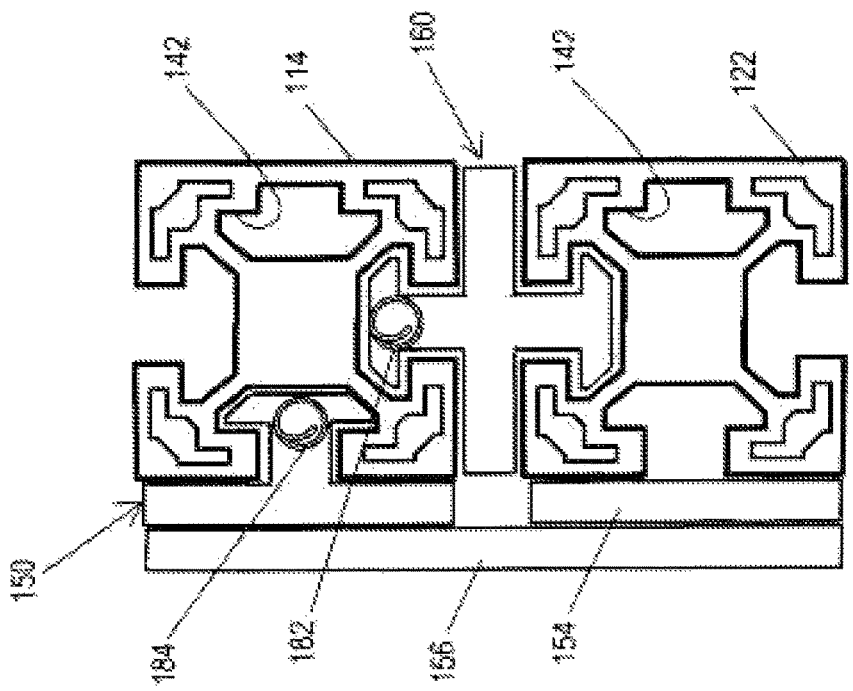
FIGS. 2A and 2B are sectional views of the chair rail and brake shoe of FIG. 1C, each taken from the direction 2A, and with portions omitted.
Figure 2B:
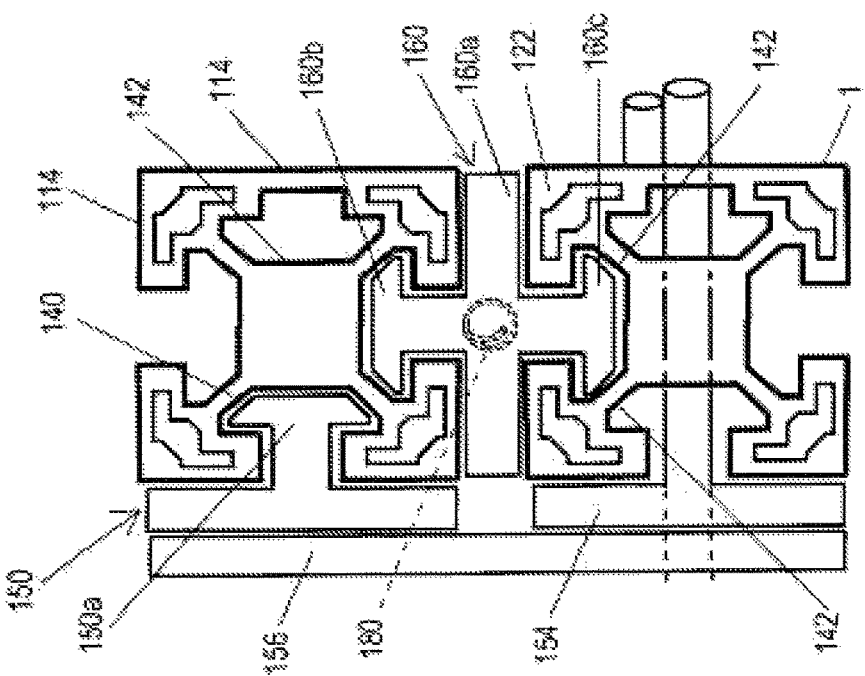

Each pair of seat and chair rails has respective first (or rear) ends 116a, 114a that can separate vertically from each other at the rear of the wheel chair (FIG. 1C is a side view of the rear end 116a of a seat rail 116 separated from the rear end 114a of a chair rail 114, and the separation is shown schematically by arrow 120). At least one pair of the seat and chair rails is biased to an orientation where their first ends 116a, 114a are separated from each other (as shown schematically in FIG. 1C), as described more fully below. The first ends of the pair of seat and chair rails are automatically moved toward each other, against their bias, when an occupant sits on a seat 118 supported by the seat rails 116. The first ends of the pair of seat and chair rails are moved automatically under their bias to their separated orientation when a wheelchair occupant starts to rise from the seat 118. An auto locking mechanism, described more fully herein, is provided that includes a brake shoe 122 with a brake member, schematically shown at 124, that automatically locks against a rear wheel 110 of the wheel chair against movement when the first ends of the pair of seat and chair rails move under the bias to a separated orientation, and automatically unlocks the wheel when a wheelchair occupant sits on the seat and causes the first (rear) ends of the seat and chair rails to move toward each other against their bias. while not shown in the Figures, the wheel chair brake shoe exerts its effect upon the wheel by its influence on a manually operated wheel locking mechanism of a type well known to those in the art (and which would have a brake member similar to that shown at 124 in FIG. 1A).

In accordance with one of the features of the present invention, the second (or front) ends 116b, 114b of the pair of seat and chair rails have predetermined positions relative to each other and a locking mechanism 130 is provided that maintains the second (front) ends of the pair of seat and chair rails in the predetermined positions relative to each other (especially when the wheel chair is in an open condition and an occupant is seated in the wheelchair). The locking mechanism comprises a U shaped member 132 that is connected to the front ends of the seat and chair rails, and maintains the front ends of the seat and chair rails in relatively stable, closely spaced) relation to each other during all operations of the wheelchair. The wheel chair is locked in this position when the wheel chair is in an open condition (FIG. 1A) and is released to allow the pairs of seat and chair rails to move up or down together and toward each other when the wheelchair is being collapsed to a folded condition (FIG. 1B).

In a preferred embodiment of this feature, the locking member 132 has a latch member 133 with a notch 137 (FIGS. 1A, 1B, 7A, 7B, 8, 9). A spring member 134 has a bottom portion connected to a support member 135 that is fixed to the vertical support 102 and a top portion that can be flexed toward and away from the notch 137. When the wheel chair is in an open condition (FIG. 1A), the top portion of the spring 134 (which is preferably hook shaped) is engaged with the notch 137, thereby holding the locking member 132 in a fixed position along the vertical support 102, and maintaining the second (front) ends of the seat and chair rails in their predetermined positions. When the chair is being folded to its collapsed condition (FIG. 1B), the spring 134 is manually pulled from the notch 137 in the latch member 133, thereby allowing the locking member 132, and the front ends of the seat and chair rails to slide along the vertical support as the chair is being folded. A slider bearing member 126, attached to the locking member 130 facilitates sliding movement of the locking member 132 along the vertical support 102. Another feature of the present invention relates to structure that causes an automatic braking device to be automatically cocked to a position where it is released from locking engagement with a wheel of the wheel chair when an occupant sits in the chair, and is automatically driven into locking engagement with the wheel of the chair as soon as the occupant starts to rise out of the chair. Moreover, structure associated with the automatic braking device provides enhanced lateral stability to the wheel chair, especially when the wheel chair is in its open position.

As can be seen from the figures, and appreciated from this disclosure, on each side of the wheel chair the seat rail 116 is located above the chair rail 114, and on at least one side of the wheel chair, a brake shoe 122 is located below the chair rail 114. The brake shoe 122 carries a locking member 124 (FIG. 1A) that engages the wheel 110 of the chair when the brake shoe is driven into locking engagement with the wheel 110. Each of the seat rails, chair rails, and the brake shoe is preferably formed of a light weight metal (e.g aluminum) and each has the cross sectional configuration shown e.g. in FIGS. 2A, 2B, 3A, 3B, where each aluminum member has longitudinal recesses (or tracks) 142 (preferably 4 recesses per member) extending along its length.

In accordance with the invention, the stabilizing structure is preferably located along the inside of the chair rail and brake shoe, and preferably comprises an inside slider bearing 150 located on the inside of and against the chair rail, an inside shim 154 on the inside of and against the brake shoe, and an inside stabilizing cover 156 located against and fixed to the inside slider bearing 150 and the inside shim 154 (e.g. by one or more fasteners). The inside slider bearing 150 has a portion 150a extending into and having a configuration that closely fits into a longitudinal slot in the side of the adjacent chair rail (see FIG. 2A). In addition, a brake shoe slider bearing 160 extends between the chair rail and the brake shoe, and has a portion 160a between the chair rail and brake shoe, and portions 160b, 160c that extend into the longitudinal slots in the bottom of the chair rail and top of the brake shoe. This structure provides significant lateral stability to that one side of chair rail and the adjacent brake shoe, and thereby provides significant lateral stability to chair rail and the brake shoe and to the wheel chair, especially when the wheel chair is in an open (uncollapsed) condition.

In addition, the auto lock mechanism comprises a brake actuator member 170 that moves (pivots about a pin 173 on the chair rail) in opposite directions in relation to the brake shoe 122. The brake actuator member 170 (i) automatically moves in a first direction (shown by arrow 172 in FIG. 1C) when an occupant sits on the chair, and engages a roller 174 on the brake shoe to move the brake shoe to a released position relative to the wheel of the wheel chair and to place one or more springs (described below) in a cocked state from which when released they automatically drive the brake shoe 122 to a locking position in which it locks against the wheel of the wheel chair, and (ii) automatically moves in a second direction (shown by the arrow 176 in FIG. 1D) whenever the occupant starts to rise from the chair to release the springs from their cocked state and allows the springs to drive the brake shoe 122 into locking engagement with a wheel 110 of the wheel chair.

Figure 3A:
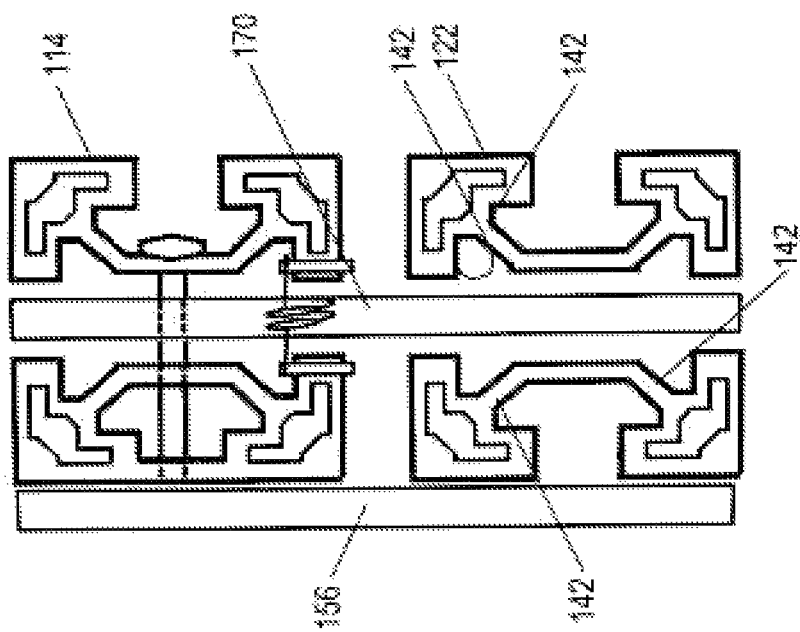
FIGS. 3A and 3B are sectional views of the chair rail and brake shoe of FIG. 1C, taken from the directions 3A-3A and 3B-3B respectively, and with portions omitted.
Figure 3B:
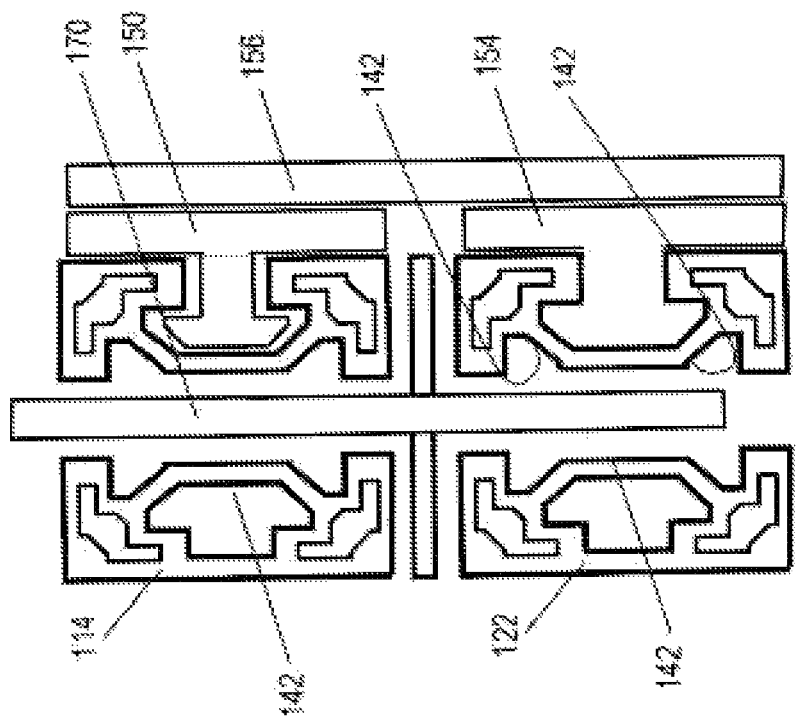
Figure 7A:
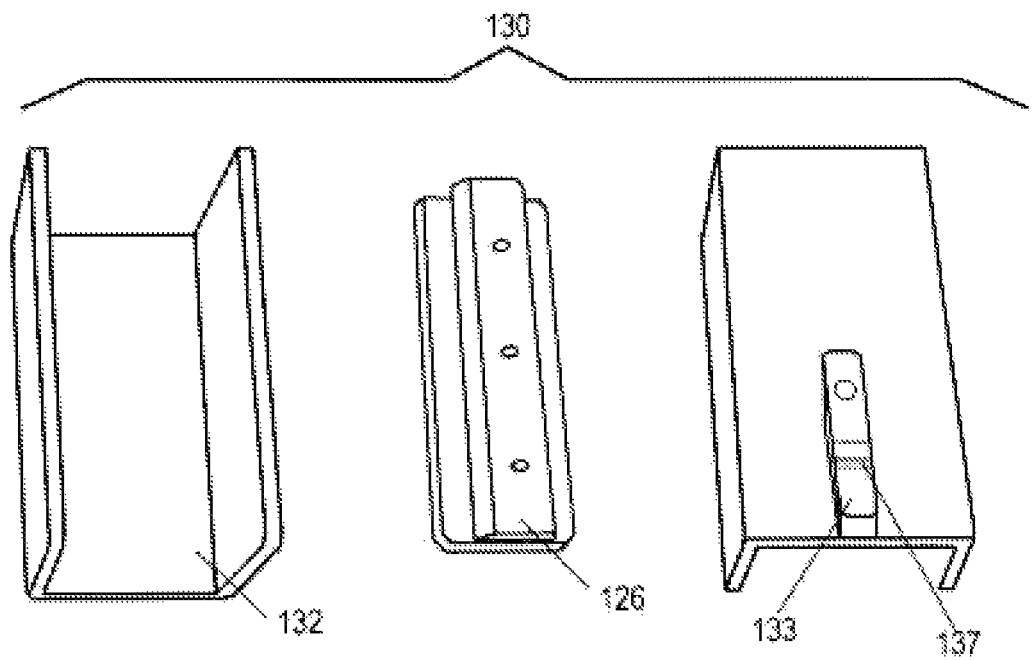
FIGS. 7A and 7B are schematic illustrations of the lock mechanism that holds the front ends of the seat and chair rail in predetermined relation to each other and the latch portion that is engaged by the spring to hold the chair is in an open condition.
Figure 7B:
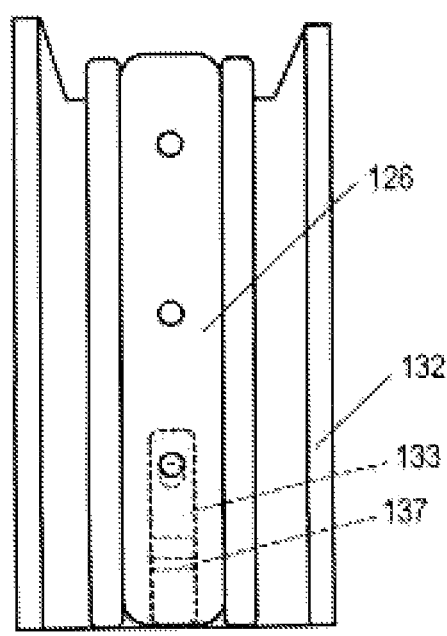
Figure 8:
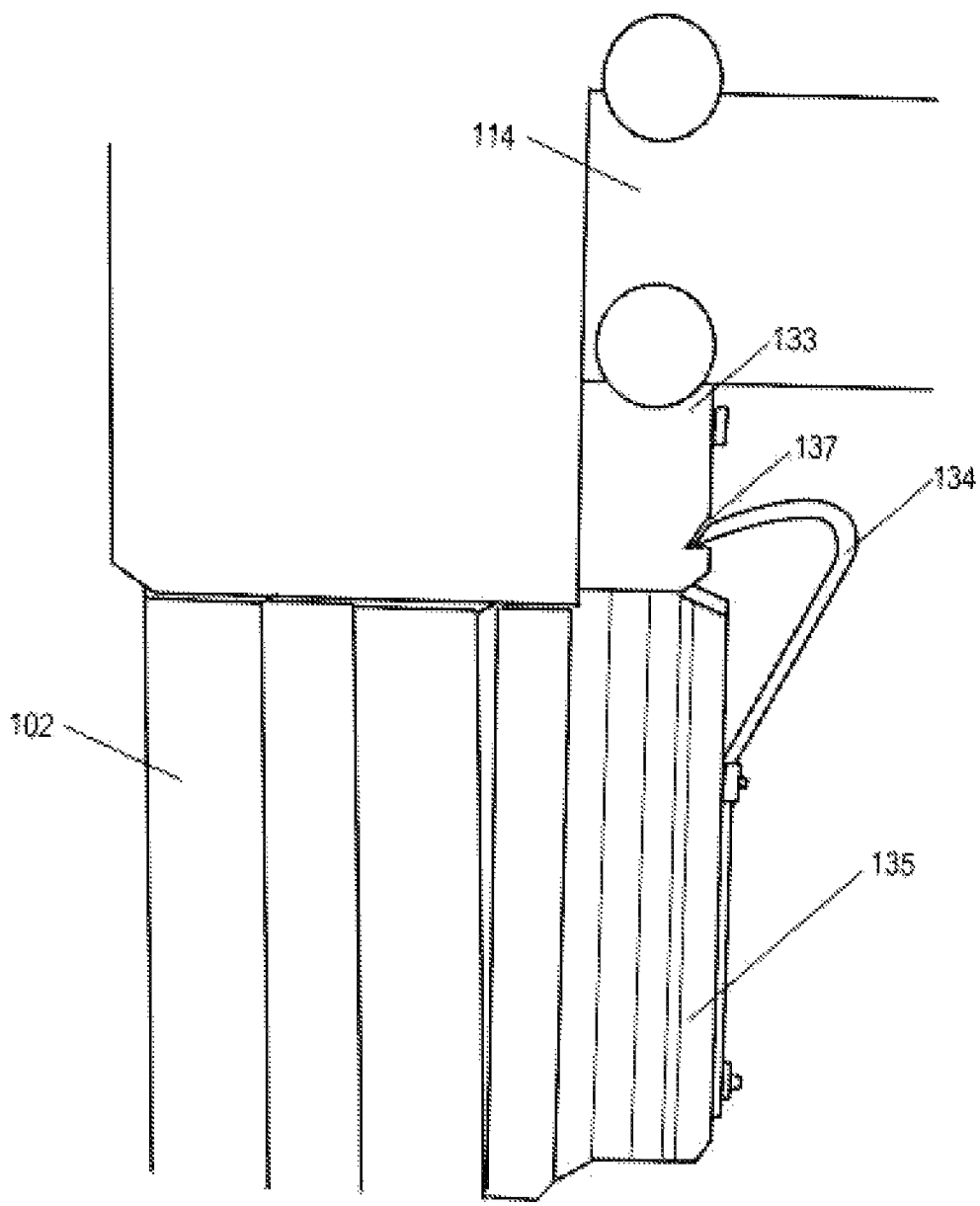
FIG. 8 is a side view of the lock mechanism, latch portion and spring member that hold the chair in an open position when the spring is engaged with the latch.
Figure 9:
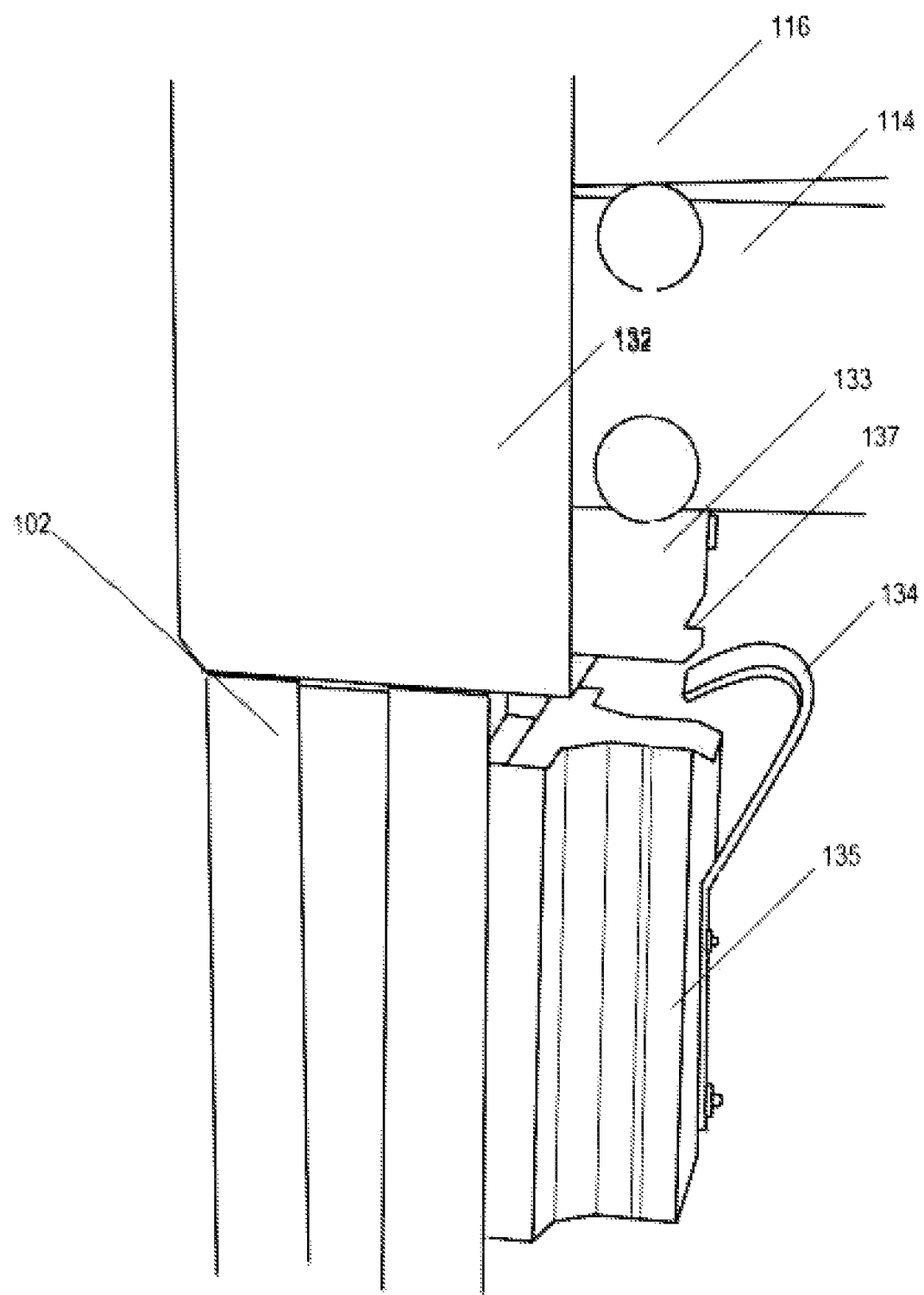
FIG. 9 is a side view of the lock mechanism, latch portion and spring member, when the spring is released from the latch portion, to allow the lock mechanism to move along the vertical frame member as the chair is being folded to a collapsed condition.

The brake shoe 122 is located below the chair rail 114 and is slidably coupled with the chair rail by means of the brake shoe slider bearing 160. One or more biasing springs acts (directly or indirectly) on the brake shoe 122 and biases the brake shoe into in a direction that drives it into locking engagement with the wheel of the wheel chair. In the preferred embodiment, one biasing spring 180 acts between the brake shoe 122 and the rear frame member 104. That biasing spring is normally in a state of compression and is tensioned when the brake shoe 122 moves in the direction of arrow 186 (FIG. 1C) to a cocked, or unlocked position. A pair of biasing springs 182, 184 are located in respective tracks 160 in the chair rail. Those biasing springs act between the front frame 102 and the brake shoe 122, and are compressed when the brake shoe 122 is moved in the direction of arrow 186 (FIG. 1C) to a cocked state in which it releases from locking engagement with the wheel 110. Thus, all of the biasing springs 180, 182 and 184 are in a state of tension or compression that stretches or compresses them against their respective bias when the brake shoe is moved to a cocked or unlocked condition, and each biasing spring is released from its state of compression or tension and acts on the brake shoe 122 to drive the brake shoe in the direction shown by arrow 187 in FIG. 1D and into engagement with a wheel 110 of the wheel chair when a patient starts to rise from the seat. Preferably, the brake shoe actuator 170 extends through slots in the centers of the associated chair rail and brake shoe (FIGS. 3A, 3B).

Figure 10:
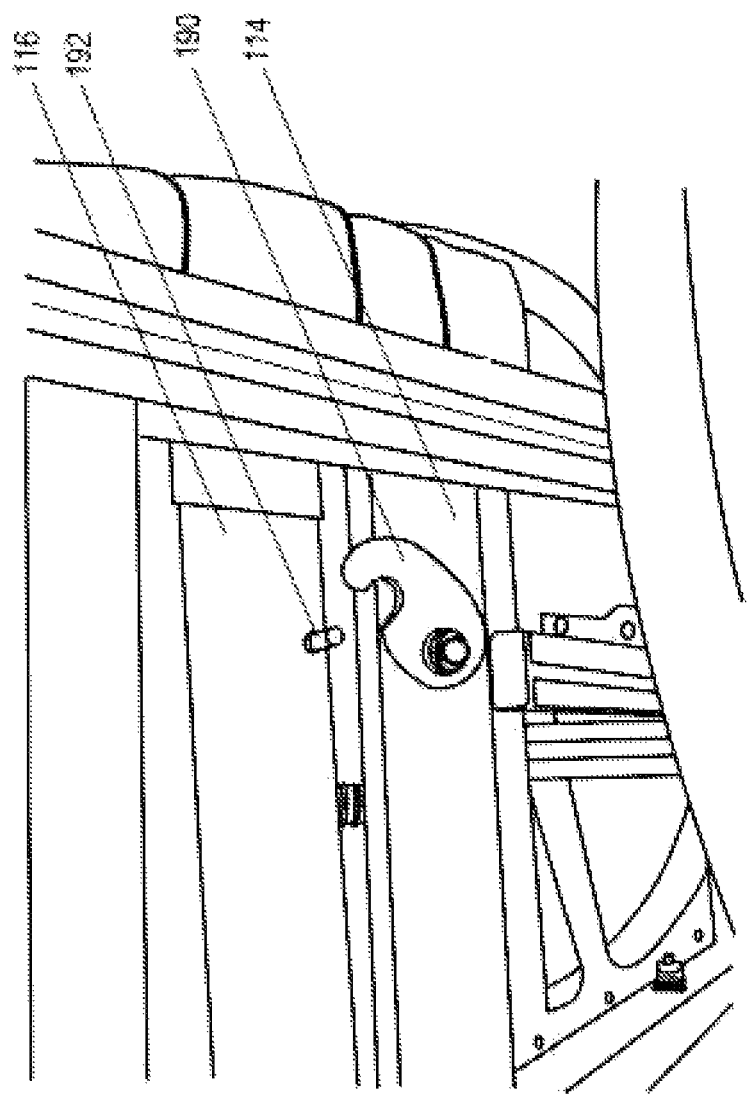
FIG. 10 is a three dimensional illustration of the holding member that can be selectively operated to hold the chair in an unlocked condition when there is no occupant in the chair and it is desired to wheel the chair.
Figure 11:
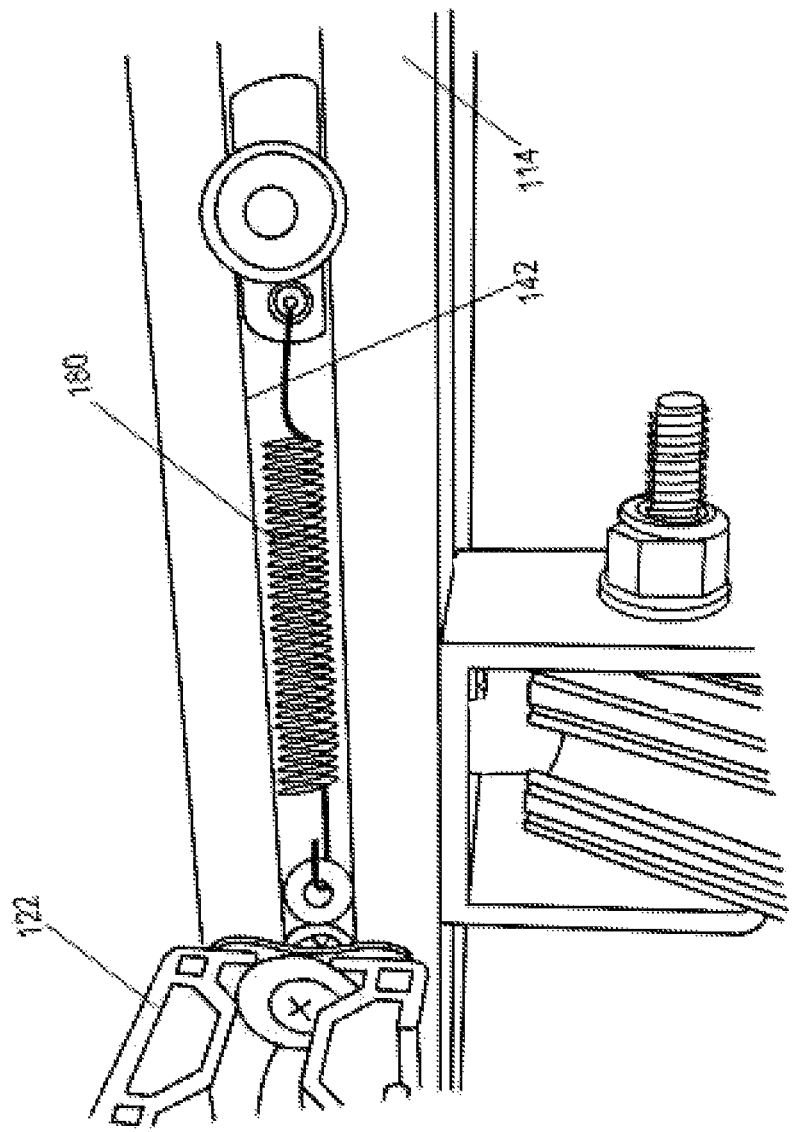
FIG. 11 is a three dimensional view of the chair rail, a portion of the brake shoe and the spring located in the chair rail that acts between the frame and the brake shoe.

The stabilizing structure acts on the inside of the chair rail and brake shoe, and between the chair rail and the brake shoe to laterally stabilize the movement of the chair rail and brake shoe, which provides significant lateral stability to the entire wheel chair. At least one of the biasing springs 182 comprises a stabilizing tension/compression spring on the inside of the chair rail that acts on the brake shoe slider bearing 160 and helps drive the brake shoe 122 into engagement with the wheel while also laterally stabilizing the movement of the brake shoe when the brake shoe is urged into engagement with the wheel of the wheelchair. Another tension/compression spring 184 acts on the inside slider bearing 150 to also help drive the brake shoe into engagement with the wheel 110 while providing lateral stability to the movement of the brake shoe when the brake shoe is driven into engagement with the wheel of the wheel chair. The other tension/compression spring 180 also helps drive the brake shoe into locking engagement with the wheel of the wheel chair and also helps urge the brake shoe actuator 170 in the direction of the arrow 176 in FIG. 1D and against a track in the bottom of the seat rail that is above the chair rail, in the direction shown by arrow 179 in FIG. 1D, to return the brake shoe actuator to a condition as it raises the first (or rear) portion of the seat rail when a patient starts to rise from the seat, to return the locking mechanism to its state where no patient is seated in the wheel chair. Thus, when no occupant is in the wheel chair, the wheel chair is normally in its biased, locked state. However, in yet another new and useful feature of the wheel chair of the present invention, and as seen e.g. in FIG. 10, the rear ends of the seat and chair rails can be pushed toward each other and a gravity operated holding member 190 on the chair rail can be selectively rotated to a position in which it engages a pin 192 on the seat rail to hold the first (rear) ends of the pairs of seat and chair rails in proximity to each other and in a state in which the biasing springs 180, 182, 184 are in their states of tension and/or compression against their respective spring bias when there is no occupant in the wheel chair, so that the auto locking mechanism is held out of engagement with the wheel of the wheel chair when there is no occupant in the wheel chair. This enables the wheel chair to be freely wheeled, but when an occupant sits on the chair, the rear ends of the seat and chair rails are moved further toward each other, allowing the gravity operated member 190 to pivot by gravity in a direction that releases it from the seat and chair rails, so that the occupant will causes the rear ends of the seat and chair rails to move to even closer proximity to each other such that biasing springs are maintained in their respective states of tension or compression that is against their respective bias, when the wheel chair occupant is seated on the seat.

Thus, as seen from the foregoing description and figures, applicants have provided a wheel chair with several new and useful features, that provide enhanced lateral stability, automatic cocking of an automatic locking device whenever an occupant sits in the wheel chair, and a holding mechanism that enables the wheel chair to be freely wheeled about when there is no occupant, and automatically move to a cocked state as soon as an occupant sits on the chair. With the foregoing disclosure in mind, it is believed that various adaptations of a wheel chair, with one or more of the foregoing new and useful concepts, will be apparent to those in the art.

The invention claimed is:

1. A wheelchair having a pair of wheels, a pair of chair rails and a pair of seat rails, where each chair rail of the pair of chair rails is located on one side of the one of the pairs of wheels and is paired with a respective seat rail of the pair of seat rails that is located on the same side of the one of the pairs of wheels, where each seat rail is oriented on top of a respective chair rail, the seat rails supporting a seat for an occupant of the wheelchair, the pair of seat and the pair of chair rails being spaced apart when the wheelchair is in an open condition and the pair of seat rails and the pair of chair rails being moveable toward each other to enable the wheelchair to be collapsed to a folded condition, each pair of seat and chair rails located on a respective side of one of the wheels having respective first ends that can separate from each other, and respective second ends opposite the first ends, at least one pair of the seat and chair rails located on a side of one of the wheels being biased to an orientation where their first ends are separated from each other, the first ends of the pair of seat and chair rails being automatically moveable against their bias and toward each other when a wheelchair occupant sits on seat supported by the seat rails, and the first ends of the pair of seat and chair rails located on the side of the one of the wheels being automatically moveable under the bias to a separated position when a wheelchair occupant starts to rise from the seat, an auto locking mechanism including a brake that automatically locks a wheel of the wheelchair against movement when the first ends of the pair of seat and chair rails located on the side of the one of the wheels move under the bias to a separated position, and automatically unlocks the wheel when a wheelchair occupant sits on the seat and causes the first ends of the seat and chair rails located on the side of the one of the wheels to move toward each other against the bias, the second ends of the pair of seat and chair rails located on the side of the one of the wheels, and a lock mechanism that maintains the second ends of the pair of seat and chair rails located on the side of the one of the wheels in predetermined positions relative to each other during all relative movements of the first ends of the seat and chair rails on the side of the one of the wheels relative to each other, the lock mechanism being selectively releasable to allow the pairs of seat and chair rails on the side of the one of the wheels to move upwards together toward each other when the wheelchair is being collapsed, wherein a latch and spring assembly is associated with the lock mechanism and is selectively operable to release the lock mechanism and allow the pairs of seat and chair rails to move upwards together toward each other when the wheelchair is being collapsed, and wherein the lock mechanism is slidable along a vertical support of the wheelchair and engages the second ends of at least one pair of seat and chair rails, to maintain the second ends of the pair of seat and chair rails in their predetermined positions relative to each other.

2. The wheelchair of claim 1 wherein the latch and spring assembly comprises a latch member slidable with the lock mechanism along the vertical support and a spring member that is in fixed position on the vertical support; wherein the spring member is biased into engagement with a notch of the latch member to hold the locking member in a fixed position along the vertical support with the wheelchair is in an open condition; and wherein the spring member is selectively moved against its bias and out of engagement with the latch member, to allow the locking mechanism, and the seat and chair rails connected with the locking mechanism to slide along the vertical support member as the wheelchair is being folded to its collapsed condition.

3. The wheelchair of claim 2, wherein the one pair of seat and chair rails has a predetermined orientation in which the seat rails is located on top of the chair rail associated with that seat rail when the wheelchair is in an open condition, and wherein the auto locking mechanism comprises a brake shoe located below the chair rail of that pair, and stabilizing structure is provided on at least one side of that pair of seat and chair rails and is configured to maintain lateral stability of that pair of seat and chair rails and the brake shoe whenever the wheelchair is in an open condition.

4. The wheelchair of claim 3, wherein the stabilizing structure comprises one or more shims located on at least one side of the pair of seat and chair rails and the brake shoe, to maintain lateral stability of the pair of seat and chair rails and the brake shoe whenever the wheelchair is in an open condition.

5. The wheelchair of claim 4, wherein the auto lock mechanism comprises a brake actuator member that moves in opposite directions in relation to the brake shoe, the brake actuator being (i) automatically moveable in a first direction when an occupant sits on the wheelchair to move the brake shoe to a released position relative to the wheel of the wheelchair and to place one or more springs in a cocked state from which when released they automatically move the brake shoe to a locking position in which it locks the wheel of the wheelchair, and (ii) automatically moveable in a second direction whenever the occupant starts to rise from the wheelchair to release the springs from their cocked state and allows the springs to move the brake shoe to a locking position.

6. The wheelchair of claim 5, wherein the brake shoe is located below the chair rail and is slidably coupled with the chair rail by means of a brake shoe slider bearing, wherein one or more biasing springs acts directly or indirectly on the brake shoe and biases the brake shoe into locking engagement with the wheel of the wheel chair, wherein the biasing springs are all in a state of tension or compression that are against their respective bias when the brake shoe is in an unlocked condition, and each biasing spring is released from its state of compression or tension and acts on the brake shoe to urge the brake shoe into engagement with a wheel of the wheelchair when a patient starts to rise from the seat, and wherein the brake shoe actuator is pivotally connected with the chair rail and acts on the brake shoe to urge the brake shoe to an unlocked condition when a patient is seated on the wheelchair.

7. The wheelchair of claim 6, wherein the brake shoe actuator is pivotally connected with the chair rail and acts on a roller on the brake shoe to urge the brake shoe to the unlocked condition.

8. The wheelchair of claim 7, wherein a stabilizing slider bearing acts between the chair rail and the brake shoe to laterally stabilize the movement of the brake shoe.

9. The wheelchair of claim 8, wherein at least one of the biasing springs comprises a stabilizing compression spring on the inside of the chair rail that acts on the slider bearing and helps urge the brake shoe into engagement with the wheel while also laterally stabilizing the movement of the brake shoe when the brake shoe is urged into engagement with the wheel of the wheelchair.

10. The wheelchair of claim 9, wherein the biasing springs comprise a return spring that acts between the chair rail and the brake shoe actuator to urge the brake shoe actuator to a condition where it raises the seat rail when a patient starts to rise from the seat, to enhance the movement of the brake shoe into engagement with the wheel of the wheelchair when a patient starts to rise from the wheelchair.

11. The wheelchair of claim 10, wherein a gravity operated holding member is in a holding condition in which it holds the first ends of the pairs of seat and chair rails in proximity to each other and in a state in which the biasing springs are in tension and/or compression against their respective spring bias when there is no occupant in the wheelchair, so that the auto locking mechanism is held out of engagement with the wheel of the wheelchair when there is no occupant in the wheelchair, thereby enabling the wheelchair to be freely wheeled, and wherein the gravity operated member is automatically released from the holding condition when an occupant sits on the seat, whereby the occupant will cause the first ends of the pairs of seat and chair rails to move to even closer proximity to each other such that biasing springs are maintained in their respective states of tension or compression that is against their respective bias, when the wheelchair occupant is seated on the seat.

12. A wheelchair having a pair of wheels, a pair of chair rails and a pair of seat rails, where each chair rail of the pair of chair rails is located on one side of the one of the pairs of wheels and is paired with a respective seat rail of the pair of seat rails that is located on the same side of the one of the pairs of wheels, where each seat rail is oriented on top of a respective chair rail, the seat rails supporting a seat for an occupant of the wheelchair, at least one pair of the seat and chair rails being located on one side of one of the wheels and being biased to an orientation where their first ends are separated from each other, the first ends of the pair of seat and chair rails being automatically moveable against their bias and toward each other when a wheelchair occupant sits on seat supported by the seat rails, and the first ends of the pair of seat and chair rails being automatically moveable under the bias to a separated position when a wheelchair occupant starts to rise from the seat, an auto locking mechanism including a brake that automatically locks a wheel of the wheelchair against movement when the first ends of the pair of seat and chair rails move under the bias to a separated position, and automatically unlocks the wheel when a wheelchair occupant sits on the seat and causes the first ends of the pair of seat and chair rails to move toward each other against the bias; wherein the pair of seat and chair rails has a predetermined orientation in which the seat rail is located on top of the chair rail, and wherein the auto locking mechanism comprises a brake shoe located below the chair rail of that pair of seat and chair rails, and a stabilizing structure is provided on at least one side of that pair of seat and chair rails and is configured to maintain lateral stability of that pair of seat and chair rails and the brake shoe whenever the wheelchair is in an open condition; wherein the stabilizing structure comprises one or more shims located on at least one side of the pair of seat and chair rails and the brake shoe, to maintain lateral stability of the pair of seat and chair rails and the brake shoe whenever the wheelchair is in an open, uncollapsed, condition.

13. The wheelchair of claim 12, wherein the auto lock mechanism comprises a brake actuator member that moves in opposite directions in relation to the brake shoe, the brake actuator being (i) automatically moveable in a first direction when an occupant sits on the wheelchair to move the brake shoe to a released position relative to the wheel of the wheelchair and to place one or more springs in a cocked state from which when released they automatically move the brake shoe to a locking position in which it locks the wheel of the wheelchair, and (ii) automatically moveable in a second direction whenever the occupant starts to rise from the wheelchair to release the springs from their cocked state and allows the springs to move the brake shoe to a locking position.

14. The wheelchair of claim 13, wherein the brake shoe is located below the chair rail and is slidably coupled with the chair rail by means of a brake shoe slider bearing, wherein one or more biasing springs acts directly or indirectly on the brake shoe and biases the brake shoe into locking engagement with the wheel of the wheelchair, wherein the biasing springs are all in a state of tension or compression that are against their respective bias when the brake shoe is in an unlocked condition, and each biasing spring is released from its state of compression or tension and acts on the brake shoe to urge the brake shoe into engagement with a wheel of the wheelchair when a patient starts to rise from the seat, and wherein the brake shoe actuator is pivotally connected with the chair rail and acts on the brake shoe to urge the brake shoe to an unlocked condition when a patient is seated on the wheelchair.

15. The wheelchair of claim 14, wherein the brake shoe actuator is pivotally connected with the chair rail and acts on a roller on the brake shoe to urge the brake shoe to the unlocked condition.

16. The wheelchair of claim 15, wherein a stabilizing slider bearing acts between the chair rail and the brake shoe to laterally stabilize the movement of the brake shoe.

17. The wheelchair of claim 16, wherein at least one of the biasing springs comprises a stabilizing compression spring on the inside of the chair rail that acts on the slider bearing and helps urge the brake shoe into engagement with the wheel while also laterally stabilizing the movement of the brake shoe when the brake shoe is urged into engagement with the wheel of the wheelchair.

18. The wheelchair of claim 17, wherein the biasing springs comprise a return spring that acts between the chair rail and the brake shoe actuator to urge the brake shoe actuator to a condition where it raises the seat rail when a patient starts to rise from the seat, to enhance the movement of the brake shoe into engagement with the wheel of the wheelchair when a patient starts to rise from the wheelchair.

* * * * *